United States Patent [19]

Dollheimer et al.

[11] 4,371,813

[45] Feb. 1, 1983

[54] CIRCUIT ARRANGEMENT FOR MOVING A MARKER OVER THE PICTURE SCREEN

[75] Inventors: Jürgen Dollheimer; Klaus Knoll, both of Karlsruhe, Fed. Rep. of Germany

[73] Assignee: Siemens Aktiengesellschaft, Munich, Fed. Rep. of Germany

[21] Appl. No.: 173,361

[22] Filed: Jul. 29, 1980

[30] Foreign Application Priority Data

Aug. 10, 1979 [DE] Fed. Rep. of Germany ....... 2932564

[51] Int. Cl.³ .............................................. H01J 29/70
[52] U.S. Cl. .................................................... 315/377
[58] Field of Search ................ 315/377; 273/DIG. 28

[56] References Cited

U.S. PATENT DOCUMENTS

| | | | |
|---|---|---|---|
| 2,551,681 | 5/1951 | Lawrence, Jr. et al. | 315/377 X |
| 2,901,664 | 8/1959 | Firmenich | 315/377 |
| 3,076,120 | 1/1963 | Matthews et al. | 315/377 |
| 3,118,085 | 1/1964 | Clergue et al. | 315/377 |
| 4,180,805 | 12/1979 | Burson | 273/DIG. 28 |
| 4,211,982 | 7/1980 | Smith | 315/377 X |

OTHER PUBLICATIONS

"Spacewar: Real-Time Capability of the PDP-1" by J. M. Graetz, *Decuscope, Information for Digital Equipment Computer Users,* vol. 1, No. 1, Apr. 1962.

*Primary Examiner*—Malcolm F. Hubler
*Attorney, Agent, or Firm*—Kenyon & Kenyon

[57] ABSTRACT

An arrangement for displacing a marker on the picture screen of a display device, in which, to shift the marker rapidly as well as exactly, the marker is displaced by means of a rotary pulse generator, the direction of rotation determining the direction of displacement and the speed of rotation the speed of displacement. The output pulses of the rotary pulse generator are supplied to a progressive frequency transformer which generates more output pulses per input pulse the higher the frequency of the input pulses.

13 Claims, 7 Drawing Figures

CIRCUIT ARRANGEMENT FOR MOVING A MARKER OVER THE PICTURE SCREEN

BACKGROUND OF THE INVENTION

This invention relates to a circuit arrangement for moving a marker over the picture screen of a display device in general and more particularly to a circuit arrangement for doing this quickly and accurately.

Circuit arrangements for moving a marker having a position transmitter, upon the actuation of which pulses of switchable frequency are supplied to position counters each of which is associated with a coordinate in which the marker is displaceable, with the value stored in the counter corresponding to the position of the marker on the screen and the direction of counting controlled according to the desired displacement direction on the coordinate are known. For example, in German patent application DE-AS No. 18 17 227, filed Dec. 27, 1968 an arrangement for the marking of picture points on the screen of a television display device is described where a track (rolling) ball device, among other things, is used as a positioning unit. With such a device, a freely movable ball can be turned by hand in all directions. The rotary movements are transmitted by two friction wheels offset by 90°, and each associated with a coordinate of the picture screen, to signal generators, e.g., optical or magnetic pulse generators. These pulses are supplied to position counters, from which the representation of the marker is derived, so that their reading corresponds to the picture screen coordinates at which the marker is displayed.

With such a device the marker can indeed be set to every point of the picture screen, but, especially with a large number of picture points, e.g. 2048, in one line, the setting may take too long. According to DE-OS No. 24 46 692, filed Sept. 30, 1974, in which an arrangement is described by which the marker is displaced by means of keys, this problem can be solved in that, upon a short depression of a key, the marker is displaced by only one picture point. But, upon a longer key depression, the marker automatically runs in the desired direction from point to point, e.g. at intervals of 1/10 sec, and upon a longer duration of the key depression, the speed of the marker can be increased further. With this mode of marker displacement a disturbing factor is that after a key depression one must first wait for a delay time before the marker is displaced at a higher speed.

It is the object of the present invention to provide an arrangement with which a marker can be displaced on the picture screen of a display device in an ergonomically favorable manner, namely so that the displacement over large distances occurs at high speed, but yet exact positioning to a picture point is possible.

SUMMARY OF THE INVENTION

According to the present invention, this problem is solved through a position transmitter having one rotary pulse generator per coordinate, the output of which is supplied to a progressive frequency transformer which delivers a number of output pulses per input pulse, the number increasing with an increasing frequency of input pulses. The output of the progressive frequency transformer is supplied to its respective counter for that coordinate.

If it is to be possible to move the marker in two coordinate directions, a track ball device which contains one rotary pulse generator per coordinate direction is generally set. For displacement in one coordinate direction, e.g. displacement of a vertical marker in a logic analyzer, a rotary knob with a single rotary pulse generator is sufficient. The rotary pulse generators may be constructed in known manner, e.g. a cutting blade ("wing shutter") may be rotatably arranged in the ray paths of a pair of opposed light sources and light receivers, e.g., luminescence diodes and photo elements. Two light sources and receivers are required when the direction of rotation is to be established. Advantageously the rotary pulse generator is provided with a ratchet so that it cannot stop in an indifferent position, in which, for example, the luminous ray between light source and receiver is half-interrupted. The speed proportional frequency of the output pulses is transformed into a speed progressive frequency, i.e., when the rotary knob or the track ball is turned slowly, the frequency supplied to the position counter is proportional to the speed of rotation. One can thus move the marker point by point by slow rotation of the track ball or rotary knob. When turning faster, however, from a given speed of rotation on, switching to a somewhat higher frequency occurs; with further increase of the speed of rotation further frequency increases occur. Depending on the selection of this progression, by a few rapid revolutions of the position transmitter the marker can be moved over the entire picture screen, e.g. over 2048 picture points. The progression is selected according to physiological and ergonomical factors as a function of the size of the control element of the position transmitter, its ease of motion, the number of pulses which the position transmitter delivers per angular increment of rotation of the control element, as well as the number of picture points on the picture screen.

In some cases, e.g., upon reduction of the number of picture points as in the case when picture details are shown enlarged, it is advantageous, therefore, to diminish the frequency increase, so that the marker will not be moved over the picture screen too fast.

DETAILED DESCRIPTIONS OF THE INVENTION

Figure 1A:
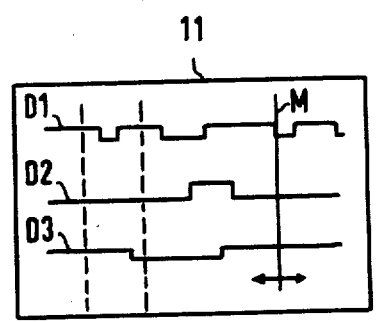
FIGS. 1a and 1b illustrates an application of the present invention.

An area of application of the invention are so-called logic analyzers, i.e., devices by which several binary signals tapped at different points of a circuit, can be represented simultaneously as time diagrams. FIG. 1a shows as an example the representation of three diagrams D1, D2, and D3 on the picture screen 11 of a display device. In order that the three diagrams can be compared, a vertically extending marker M is provided which can be moved along the time axis, i.e., in the horizontal direction. Each diagram is to extend, e.g., over 2048 picture points in the horizontal direction. Accordingly it must be possible to set the marker M on this number of picture points. Here two contradictory requirements exist: on the one hand, it must be possible to set the marker M separately on each picture point exactly and hence slowly, on the other hand it must be possible to move it quickly over the entire picture screen. According to a development of the present invention, in such a case, where the marker M needs to be moved only in horizontal direction, that is, only in the direction of a single coordinate, there is provided as positioning transmitter a rotary knob, which permits convenient setting as usual. If this rotary knob is turned slowly, a pulse generator connected to it delivers pulses at a low frequency, so that the marker M can be moved point by point, the direction of displacement corresponding to the direction of rotation. If the marker is to be moved over a larger distance the knob is turned faster, resulting, according to the present invention, in an over-proportional velocity increase of the displacement of the marker M. It is possible, therefore, to move the marker over the picture screen either with many slow revolutions or with few rapid revolutions.

Figure 1B:
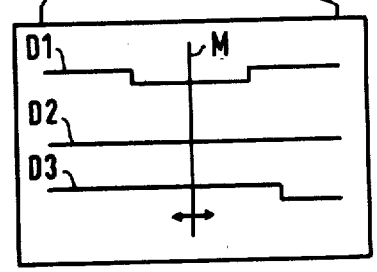

Often a picture detail is to be represented in enlarged form in the embodiment according to FIG. 1a for instance the area between broken lines. This area is expanded to extend over a complete line, resulting in the diagram representation shown in FIG. 1b. In this mode of representation it is also to be possible to use the marker M to compare the diagrams D1, D2, D3. But since now the diagrams consist of only a few picture points in the horizontal direction an over-proportional increase of the displacement velocity of marker M is not desired to the extent it was the case in the representation of FIG. 1a. For an expanded representation of the diagrams, therefore, the progression of the frequency increase will be diminished, limited, or cut out altogether.

Figure 2:
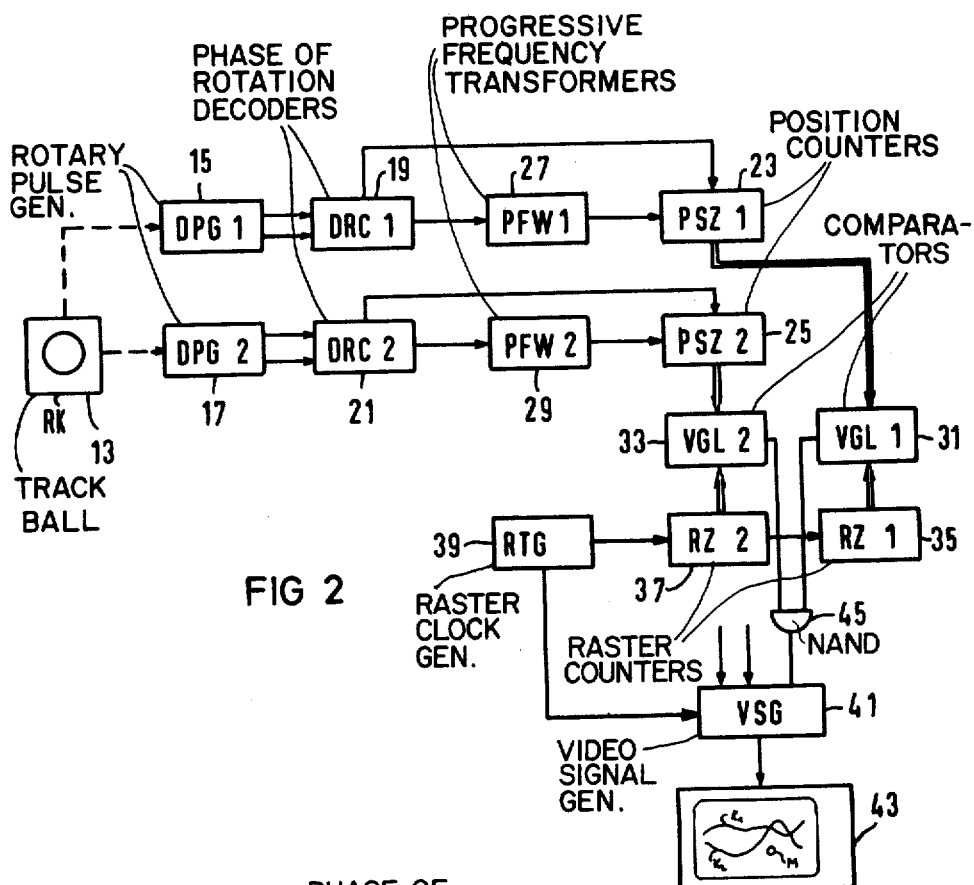
FIG. 2 is a basic circuit diagram of an embodiment of the present invention.

In the general circuit diagram of an embodiment according to FIG. 2, a track ball device 13 is provided to which are connected, over friction wheels, two rotary pulse generators, 15 and 17 associated with the two coordinate directions. Each of them delivers pulses to two phase of rotation decoders 19 and 21. Decoders 19 and 21 each generate two signals; a first signal indicates the direction of rotation and is supplied to the control (up-down) input of a position counter 23 or 25 which is a bidirectional counter whose counting direction is determined by the control signal. The second signal is a pulse train whose frequency is equal to that of the input pulse train. These are supplied respectively to progressive frequency transformers 27 and 29 which deliver a number of output pulses per input pulse to the counting input of the respective position counters 23 and 25 which increases as the input frequency increases. The respective reading of the position counters is supplied to the first inputs of comparators 31 and 33, to the second inputs of which the values stored in raster counters 35 and 37 are applied. Raster counters 35 and 37 receive, from a raster clock generator 39, pulses which it also delivers to a video signal generator 41, which forms therefrom the pulses required for the operation of a display device 43, such as synchronizing and blanking pulses. The raster counters 35 and 37, therefore, indicate the coordinates of the picture point which is just being scanned. If the comparators 31 and 33 ascertain coincidence between the contents of the raster counters 35 and 37 and the position counters 23 and 25, a coincidence gate 45 e.g., an And gate, supplies a control signal to the video signal generator 41, so that the marker is displayed at the coordinates which are given by the contents of the position counters 23 and 25. Further control signals for the representation of alphanumerical symbols and diagrams, e.g. curves K1, K2 are supplied to the video signal generator 41. These together with the output pulses of the coincidence gate 45 are transformed into video signals. Video signal generator 41 therefore delivers a complete video signal to display device 43.

Figure 3:
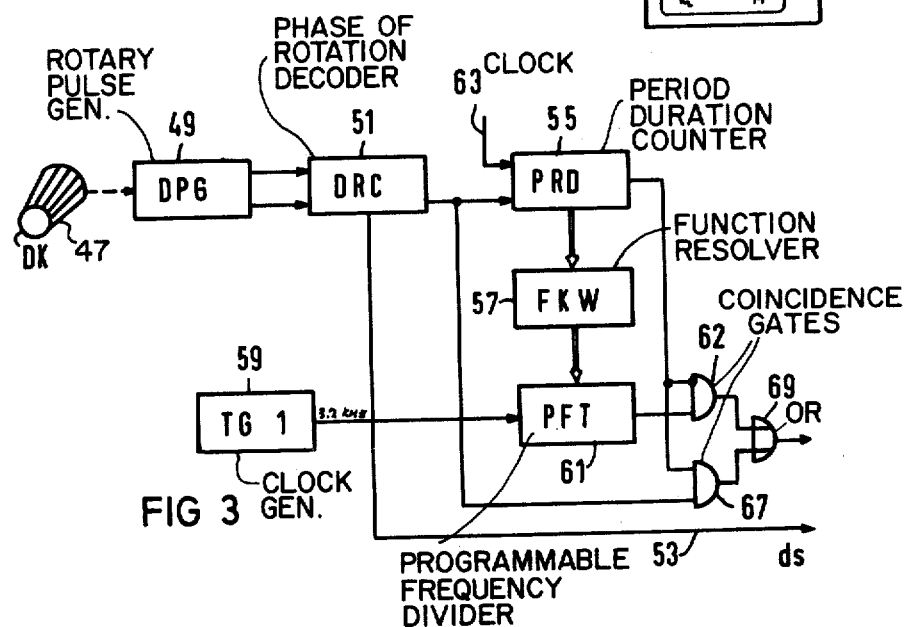
FIGS. 3 and 4 are block diagrams of two different embodiments of the present invention.

With the embodiment according to FIG. 3, a marker is to be moved, not in two coordinate directions but only in one, so that instead of a track ball device a simple rotary knob 47 is sufficient. Knob 47 is connected to a rotary pulse generator 49, the latter again produces two phase displaced pulse trains. A direction of rotation decoder 51 accordingly again delivers a signal on line 53 which marks the direction of rotation and also generates pulses whose frequency is a measure of the speed of rotation of knob 47. The unit termed a programmable frequency multiplier in the arrangement according to FIG. 2 consists, in the embodiment of FIG. 3, of a period duration counter 55, a function resolver 57 and a controllable pulse generator, consisting of a clock generator 59 and a programmable frequency divider 61. The period duration counter 55 measures the period duration in known manner by totalling clock pulses supplied via a line 63 between pairs of pulses from the decoder 51. Its respective end reading is supplied to the address input of the resolver 57, which is a ROM, in the memory cells of which is stored a number corresponding to the frequency which is to be delivered for the period duration supplied from counter 55 as an address. The programmable frequency divider 61 is driven with this number to transform the frequency of the clock generator 59 to the desired frequency. If for example the period duration can vary between zero and a binary number corresponding to the decimal number 128, the resolver 55 will have 128 memory cells each corresponding a period duration in accordance with their binary addresses. If the programmable frequency divider 61 is to furnish twenty different frequencies, numbers corresponding to these frequencies must be deposited in the 128 memory cells of the resolver 55. The programmable frequency divider 61 is a commercial component which, out of, e.g., 64 input pulses, from clock 59 blanks out a number of pulses corresponding to the number supplied to the control input. If the number zero is supplied to it, it does not blank out any pulse; if the number 63 is supplied to it, it lets pass only one of 64 pulses, that is, it has a step-down transmission ratio of 64:1. With such an arrangement, therefore, it is possible, as a function of the period duration or respectively the frequency of the output signal of the rotary pulse generator 49, to step down the frequency of the clock generator 59 in steps of 1:64 between 1:64 and 1:1, and thus to realize every function, including the desired progressive rise of the output frequency of the frequency divider 61 up to the pulse generator frequency. If the clock 59 has, e.g., a frequency of 3.2 kHz, frequencies between 50 Hz and 3.2 kHz can be set. If a frequency range of 1:64 is not sufficient, two identical programmable frequency dividers can be connected in a series and be driven parallel by the frequency transformer 57. The frequency range is then increased to about 4000:1.

An advantageous development of the invention consists in that, upon slow turning of the position transmitter, in the embodiment according to FIG. 3 the rotary knob 47, there is applied to the output, not the pulse of constant frequency derived from clock generator 59, but the pulses of the direction of rotation decoder 51 directly. Thereby a convenient fine adjustment of the marker is made possible. To this end, in the arrangement according to FIG. 3, a switch consisting of coincidence gates 62 and 67 having outputs coupled through an OR gate 69 is provided, which is controlled by the overflow pulse of the period duration counter 55. Thus, if the period duration exceeds a given value, the period duration counter 55 locks and sends the switch signal, so that it is no longer the output of the programmable frequency divider 61 that is applied to the output, but the output of the decoder 51. The switch may alternatively be controlled by the function resolver 51, in that in the cells thereof, a place is provided in which a signal can be registered which indicates into what switching position the switch should be brought at the period duration supplied as an address.

The part of the arrangement according to FIG. 3 which brings about the progressive frequency transformation can be modified in many ways. Generally it will not be necessary to use a programmable frequency divider of the kind described; it will be sufficient to use a frequency divider by the steps of which the input signal is divided in half. The individual steps can then be applied to a switching system which in turn is controlled by the frequency transformer 57 in such a way that the desired nonlinear relationship between output and input frequency exists. Also the function resolver can be simplified or be replaced by an arrangement containing several comparators which compare given period durations with the respective period duration. With the aid of exclusive OR gates it can be determined in which area the respective period duration lies, and the pulse generator or frequency divider controlled accordingly. Further, the progressive frequency transformer can also be realized by analog means, in that, e.g., the frequency or period duration of the input pulses is converted into a voltage and the voltage used to drive a nonlinearly controllable oscillator, e.g. a voltage controlled oscillator.

Figure 4:
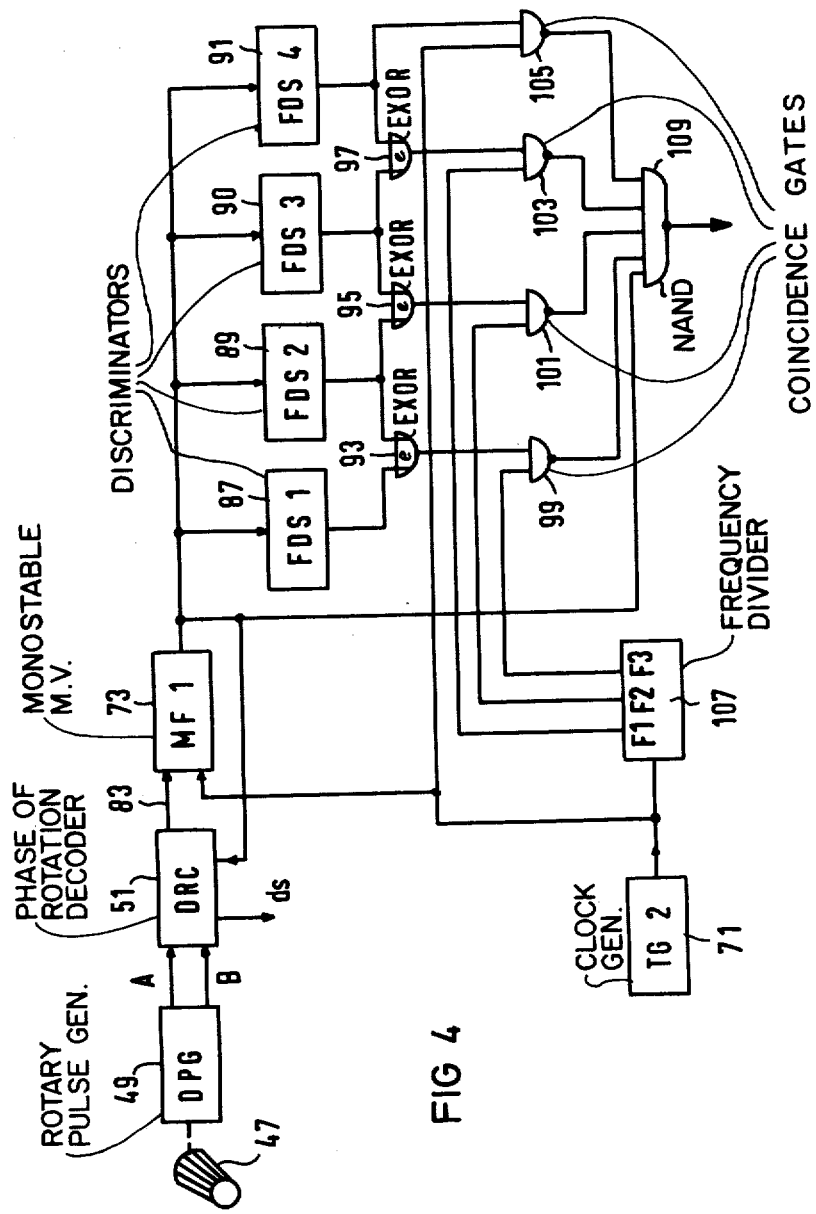

The basic circuit diagram of a further embodiment of the present invention is shown in FIG. 4. In the interest of greater clarity it is again limited to the displacement of the marker in a single coordinate direction. The position transmitter, therefore, is again a rotary knob 47 which is coupled to rotary pulse generator 49. Rotary pulse generator 49 is followed, in the manner described above, by the direction of rotation decoder 51, which sends a signal which marks the direction of rotation of knob 47 on line 53. The output pulse train of decoder 51 is not supplied directly to a progressive frequency transformer, but arrives at the enabling input of a monostable multivibrator 73, to whose clock input are supplied the pulses of a clock generator 71. The frequency of these pulses should be higher than the highest anticipated output frequency of the pulse generator 49. The monostable multivibrator 73 synchronizes the pulse generator pulses so that they will have a fixed phase position with respect to other pulses and the various pulses will not influence each other in processing. The output pulses of the monostable multivibrator 73 are fed back to the decoder 51.

Figure 5:
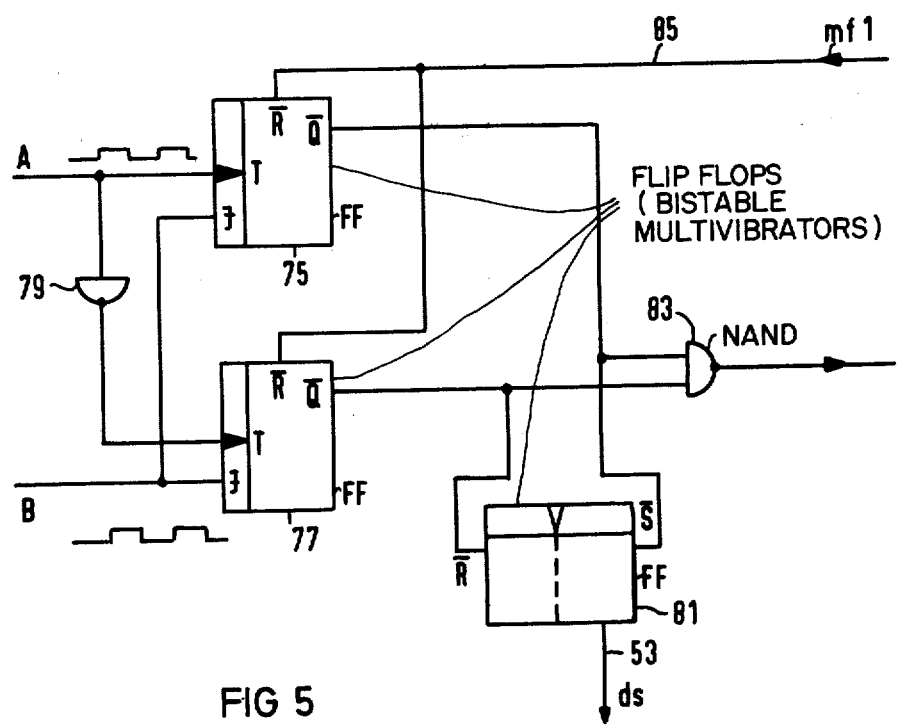
FIGS. 5 and 6 show details of the embodiment according to FIG. 4.

FIG. 5 shows details of the direction of rotation decoder 51. The pulse generator delivers, during rotation, two phase shifted pulse trains to lines A and B. The signals on line B arrive at the J inputs of two bistable multivibrators 75 and 77. The signal of line A is conducted, on the one hand, directly to the clock input T of the bistable multivibrator 75 and, on the other hand, via an inverting gate 79 to the clock input of the bistable multivibrator 77. Each multivibrators is triggered on the falling edge when its J input is at a logical "1". When rotating in one direction of the pulse generator, only the multivibrator 75 can be triggered, because only in it does the falling edge fall during a logical "1" phase at the J input. After inversion of the direction of rotation, accordingly, only the multivibrator 77 can be triggered. A third bistable multivibrator 81 is controlled by the two multivibrators 75 and 77 in such a way that, depending on the direction of rotation, it sends a "1" or a "0" signal on line 53. The output signals of the multivibrators 75 and 77 further go, via a NAND gate 83 causing an OR operation, to the enabling input of the monostable multivibrator 73 shown in FIG. 4, whose output signals are fed back to the reset inputs R of the multivibrators 75 and 77 via a line 85.

In the arrangement according to FIG. 4, the output pulses of the monostable multivibrator 73 are supplied to discriminators 87, 89, 90 and 91, which are set to different frequencies. At input frequencies which are lower than the set frequencies, e.g. an "0" signal is given, at frequencies higher a "1" signal. The outputs of the discriminators are linked with those of the discriminators tuned to the next higher or next lower frequency via exclusive OR gates 93, 95 and 97 whose outputs are each applied to one input of a respective coincidence gate 99, 101 or 103. The one input of a fourth coincidence gate 105 is coupled to the output of discriminator 91. Its second input is coupled to the output of the clock generator 71. The second inputs of the coincidence gates 99, 101 and 103 are connected to outputs F1, F2 and F3 of a frequency divider 107 at which appear the stepped down clock generator frequency. For example, the frequency at output F1 is one fourth the clock generator frequency, the one at output F2 is 1/16, and the one at output F3 is 1/32 of the clock generator frequency. The outputs of the coincidence gates 99, 101, 103 and 105 are inputs to a NAND gate 109 forming an OR linkage, which is followed by the position counter. Another input of the NAND gate 109 is coupled to the monostable multivibrator 73.

If the frequency of the output signals of the monostable multivibrator 73, which is identical with the frequency of the output signals of the pulse generator 49, is lower than the frequency, in the example 25 Hz, to which the frequency discriminator 87 is set, the same frequency will appear also at the output of the NAND gate 109. In fact, none of the discriminators 87, 89, 90 or 91 responds; their output signals are "0", and therefore the exclusive OR gates 93, 95 and 97 likewise furnish "0" signals as do the coincidence gates 99, 101, 103 and 105. Neither the output signal of the clock generator 71 nor those of the frequency divider 107 get to the NAND gate 109. In this frequency range up to 25 Hz, therefore, the output frequency of the NAND gate 109 is proportional to the speed of rotation of the rotary knob 47 and the marker can be displaced accurately as to position. If the output frequency of the pulse generator is higher than 25 Hz but lower than 38 Hz, the frequency discriminator 87 will supply a "1" signal; all other discriminators will supply a "0" signal. The exclusive OR gate 93 enables the coincidence gate 99 so that the pulses occurring at the output F4 of the frequency divider 107 at a frequency which is 1/32 of the frequency of the clock generator 71 are switched through to the output. If the pulse generator frequency is increased further to a frequency between 38 Hz and 53 Hz, the discriminators 93 and 95 will furnish "1" signals and the other two "0" signals. The exclusive OR gate 95 enables the coincidence gate 101, and the frequency at the output F2 of the frequency divider 107, of 1/16 of the clock generator frequency, is switched through to the output. If the pulse frequency is between 53 and 75 Hz, the exclusive OR gate 97 enables the coincidence gate 103 for the pulses delivered from the output F1 of the frequency divider 107, of ¼ the clock generator frequency. At a pulse generator frequency of more than 75 Hz, all four frequency discriminators have an output, and the coincidence gate 105 is enabled and the frequency of the clock generator 71 reaches the output of the NAND gate 109.

Depending on the speed of rotation of knob 47, a differently increased number of pulses per revolution reaches the output, although the knob is generally always turned by a person through approximately the same angle independently of the speed of rotation. When turning slowly, the turning operation extends over a relatively long time span, but the delivered number of pulses and hence the displacement of the marker are small, because only the pulses of multivibrator 73 and possibly also pulses of output F3 of relatively low frequency have reached the output. With a quick turning movement, the clock generator pulses, whose frequency is comparatively high, are actually switched to the output only during a short time, but this time is sufficient to send to the output a number of pulses sufficient for a large displacement of the marker, as the clock generator frequency is about 50 times higher than the pulse generator frequency.

For physiological and ergonomical reasons, the determination of the various discriminator frequencies is dependent on the knob diameter, on the ease of motion of the ratchet of the pulse generator, and the number of pulses which the pulse pulse generator delivers per revolution.

Figure 6:
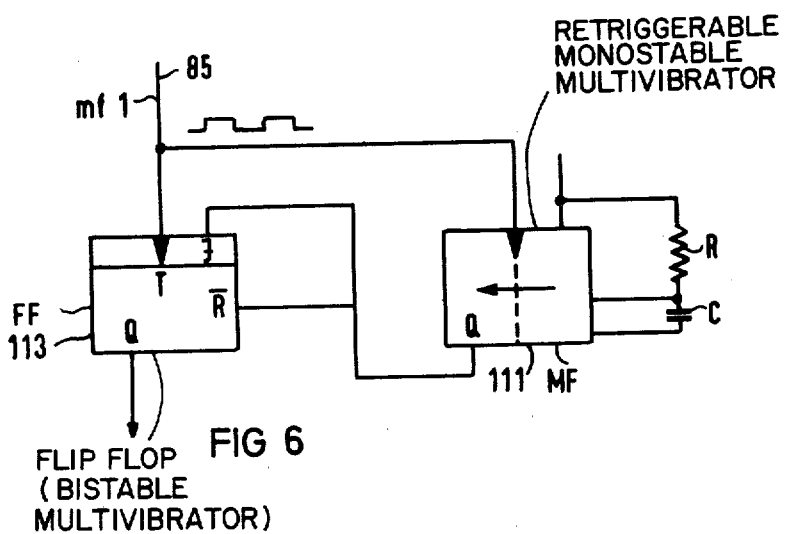

The frequency discriminators used in the arrangement according to FIG. 4 may be constructed according to the circuit diagram shown in FIG. 6. As illustrated they include a retriggerable monostable multivibrator 111 and a bistable multivibrator 113. Both are edge controlled and receive the same input signal from a line 85, which, in the arrangement according to FIG. 4, is connected to the output of the monostable multivibrator 73. The monostable multivibrator 111 is equipped with a resistor R and a capacitor C, whose time constant is selected according to the desired discriminator frequency. At the output Q of the monostable multivibrator 111 the enabling input J and the reset R of multivibrator are connected. While, therefore, the monostable multivibrator 111 is switched into the astable state by each arriving falling pulse edge or is held therein, the multivibrator 113 can be set only when the monostable multivibrator 111 is in the astable state and thus places a "1" on its J and the R inputs. The bistable multivibrator 113 therefore can deliver a "1" signal only if the period duration of the input signals on line 85 is shorter than the time constant of the monostable multivibrator 111. In this case the monostable multivibrator is retriggered with every falling edge and hence, remains in the astable state, so that multivibrator 113 always furnishes a "1" signal. If the distance between the falling edges of the input pulses becomes greater than the time constant of multivibrator, the latter flops into the stable state and thus resets the multivibrator 113.

We claim:

1. In a circuit arrangement for moving a marker over the picture screen of a display device including:
    (a) a positioning transmitter;
    (b) a pulse generator mechanically coupled to said positioning transmitter such that, upon actuation of said positioning transmitter pulses of switchable frequency are generated;
    (c) a position counter for each coordinate in which the marker is moveable, the stored value of which corresponds to the position of the marker on the picture screen and the counting direction of which is controllable according to the desired displacement direction on the coordinate, coupled to receive pulses from said position transmitter, the improvement comprising:
    (d) the pulse generator being a rotary pulse generator, one being provided for each coordinate and mechanically coupled to the positioning transmitter, said rotary pulse generator providing output pulses; and
    (e) a progressive frequency transformer for each coordinate which delivers a number of output pulses for each input pulse, said number increasing with the frequency of the input pulses, said progressive frequency transformer having the output pulses of an associated rotary pulse generator as an input and providing its output to the position counter for that coordinate.

2. The improvement according to claim 1, wherein said positioning transmitter is a track ball at which one a pulse generator per coordinate is disposed.

3. The improvement according to claim 1 or 2, wherein said positioning transmitter has a ratchet.

4. The improvement according to claim 1 and further including a direction of rotation decoder to determine the direction of rotation coupled to the output of each pulse generator providing a count direction control input to its respective position counter.

5. The improvement according to claim 4, wherein each pulse generator emits two phase shifted pulse trains and said direction of rotation decoder comprises first and second bistable multivibrators each having one of the pulse train coupled to its enabling inputs; a inverter; the other pulse train coupled directly to the clock input of said first bistable multivibrator and, through said inverter, to the clock input of said second bistable multivibrator; OR gate means having the outputs of said first and second multivibrators as inputs the output of said OR gate means providing a pulse train output; and a third multivibrator having the outputs of said first and second bistable multivibrators as inputs providing at its output the control signal for the counting direction of the position counter.

6. The improvement according to claim 5 and further including a source of clock pulses, a monostable multivibrator having its clock input coupled to said clock pulses and its enable input coupled to the output of said OR gate means, and supplying its output to the reset inputs of said first and second bistable multivibrators.

7. The improvement according to claim 1 wherein said progressive frequency transformer includes: a frequency discriminator arrangement having its input coupled to the output of said positon transmitter and a pulse generator receiving a control input from said frequency discriminator arrangement which is a function of the frequency of the input pulses.

8. The improvement according to claim 7, wherein said pulse generator comprises a clock generator generating a constant frequency; and a multi-stage frequency divider receiving inputs from said clock generator and wherein said frequency discriminator arrangement comprises means to switch the output signals of stages of said frequency divider stage to the position counter as a function of its input frequency.

9. The improvement according to claim 8 and further including means to, at least at low frequency, couple the output pulses of the position transmitter directly to the position counter.

10. The improvement according to claim 9, wherein said frequency discriminator arrangement comprises a plurality of frequency discriminators which are set to certain frequencies, a plurality of exclusive OR gates, the outputs of said frequency discriminators linked in pairs through said exclusive OR gates, the outputs of said exclusive OR gates providing control inputs to said pulse generator.

11. The improvement according to claim 10, and further including a plurality of coincidence gates each having one input coupled to a respective exclusive OR gate output and another input coupled to the respective stages of the frequency divider and a further coincidence gate having as one input the output of the discriminator set to the highest frequency and as another input the output of said clock generator.

12. The improvement according to claim 10, wherein said frequency discriminators each comprise a bistable multivibrator and a monostable multivibrator, the time constants of the monostable multivibrators being set to frequencies above which the output signals of the frequency discriminators tapped at the outputs of the bistable multivibrators change, the enabling inputs and the reset inputs of the bistable multivibrators connected to the outputs of the monostable multivibrators and the input pulses being supplied to the clock inputs of the bistable multivibrators and the clock inputs of the monostable multivibrators.

13. The improvement according to claim 1 wherein said progressive frequency transformer comprises a clock generator; a period duration counter having coupled, as an input, the output pulses of the position transmitter; a function resolver coupled to the output of said period duration counter, said function resolver providing output signals; and a prorammable frequency divider controlled by the outputs of said function resolver, said programmable frequency divider also receiving, as inputs, pulses of constant frequency supplied by said clock generator, the output pulses of said frequency divider coupled to the position counter.

* * * * *